United States Patent
Azkue et al.

(10) Patent No.: US 9,854,905 B2
(45) Date of Patent: Jan. 2, 2018

(54) SLIDING-PIVOTING MECHANISM OF A SHELF OF A PIECE OF FURNITURE OR OF A DOMESTIC APPLIANCE, PIECE OF FURNITURE, AND DOMESTIC APPLIANCE

(71) Applicant: PAUL HETTICH GMBH & CO. KG, Kirchlengern (DE)

(72) Inventors: Mikel Azkue, Zarautz (ES); Oscar Garcia, San Sebastian (ES); Eñaut Arriaga, Ordizia (ES); Iker Lopetegi, Zarautz (ES); Unai Laskibar, Zarautz (ES)

(73) Assignee: PAUL HETTICH GMBH & Co. KG, Kirchlengern (DE)

( * ) Notice: Subject to any disclaimer, the term of this patent is extended or adjusted under 35 U.S.C. 154(b) by 0 days.

(21) Appl. No.: 15/315,466

(22) PCT Filed: Jun. 3, 2015

(86) PCT No.: PCT/EP2015/062392
§ 371 (c)(1),
(2) Date: Dec. 1, 2016

(87) PCT Pub. No.: WO2015/185636
PCT Pub. Date: Dec. 10, 2015

(65) Prior Publication Data
US 2017/0164733 A1 Jun. 15, 2017

(30) Foreign Application Priority Data
Jun. 5, 2014 (DE) .................. 10 2014 107 959

(51) Int. Cl.
*F24C 15/16* (2006.01)
*A47B 46/00* (2006.01)
*A47L 15/50* (2006.01)

(52) U.S. Cl.
CPC .......... *A47B 46/005* (2013.01); *A47L 15/506* (2013.01); *A47L 15/507* (2013.01);
(Continued)

(58) Field of Classification Search
CPC ...... F24C 15/16; F24C 15/168; A47L 15/504; A47L 15/506; A47L 15/507; A47B 46/005
See application file for complete search history.

(56) References Cited

U.S. PATENT DOCUMENTS 2,590,341 A * 3/1952 Nabholz ................ A47B 21/02
16/307
2,822,229 A * 2/1958 Carlson .................. A47B 77/12
248/586

(Continued)

FOREIGN PATENT DOCUMENTS

WO 2014033092 3/2014

OTHER PUBLICATIONS

International Search Report of PCT/EP2015/062392 dated Aug. 21, 2015.
(Continued)

*Primary Examiner* — Michael Safavi
(74) *Attorney, Agent, or Firm* — Barnes & Thornburg LLP

(57) ABSTRACT

A sliding-pivoting mechanism of a shelf includes a first pivot arm and a second pivot arm. The pivot arms are attached to side walls of a body and arranged parallel to each other at a distance from each other. A guide rail is fastened to second ends of the pivot arms in such a way that the guide rail can be pivoted parallel to the plane of the side walls and that the guide rail can be pivoted from a lower position to a raised, upper position. The mechanism also includes at least one running rail, which can be moved linearly in the guide (Continued)

rail and to which the shelf is fastened. The sliding-pivoting mechanism includes a locking mechanism for preventing a pivoting motion of the sliding-pivoting mechanism in a raised and a lowered end position. The locking mechanism is arranged on the guide rail and on one of the pivot arms and can be actuated by means of an activator fastened to the running rail.

10 Claims, 15 Drawing Sheets

(52) U.S. Cl.
CPC ....... *F24C 15/16* (2013.01); *F16M 2200/025* (2013.01); *F16M 2200/063* (2013.01)

(56) References Cited

U.S. PATENT DOCUMENTS

| | | | | |
|---|---|---|---|---|
| 2,919,966 A * | 1/1960 | Preston | ................ | A47B 21/02 126/337 A |
| 3,081,138 A * | 3/1963 | Stebbins | ................ | A47B 46/00 312/319.3 |
| 3,466,108 A * | 9/1969 | Guth | ................ | A47L 15/506 126/340 |
| 3,799,640 A * | 3/1974 | Jacobs | ................ | A47L 15/506 312/273 |
| 4,134,629 A * | 1/1979 | Hansen | ................ | A47B 46/005 312/246 |
| 4,915,461 A * | 4/1990 | Kingsborough | ....... | A47B 77/10 312/247 |
| 5,115,822 A * | 5/1992 | Nichols | ................ | A47L 15/506 134/135 |
| 5,249,858 A * | 10/1993 | Nusser | ................ | A47B 46/005 312/248 |
| 5,308,158 A * | 5/1994 | Vogelgesang | ........ | A47B 46/005 211/170 |
| 5,971,513 A * | 10/1999 | Cassalia | ................ | A47L 15/506 312/272 |
| 6,247,771 B1 * | 6/2001 | Miller | ................ | A47L 15/506 312/272 |
| 7,621,605 B2 * | 11/2009 | Bond | ................ | A47B 46/00 312/311 |
| 7,731,805 B2 * | 6/2010 | Banta | ................ | A47L 15/506 134/56 D |
| 7,770,986 B1 * | 8/2010 | Simaitis | ................ | A47B 46/005 312/246 |
| 8,424,693 B1 * | 4/2013 | Hoover | ................ | A47F 5/0062 211/126.15 |
| 8,424,983 B1 * | 4/2013 | Strauss | ................ | A47B 51/00 312/247 |
| 2004/0080245 A1 * | 4/2004 | Lammens | ............. | A47B 88/49 312/333 |
| 2004/0163687 A1 * | 8/2004 | Son | ................ | A47L 15/506 134/58 D |
| 2005/0206282 A1 * | 9/2005 | Walburn | ............. | A47B 46/005 312/312 |
| 2006/0066189 A1 * | 3/2006 | Bond | ................ | A47B 46/00 312/319.1 |
| 2008/0129168 A1 | 6/2008 | Banta et al. | | |
| 2012/0074080 A1 * | 3/2012 | Garcia | ................ | A47B 46/005 211/41.9 |
| 2015/0002005 A1 * | 1/2015 | Park | ................ | A47L 15/507 312/228.1 |
| 2015/0305493 A1 * | 10/2015 | Garcia | ................ | A47B 46/005 211/86.01 |

OTHER PUBLICATIONS

English translation of International Search Report of PCT/EP2015/062392 dated Aug. 21, 2015.
Search Report issued in German Application No. 102014107959.0 dated May 12, 2015.

* cited by examiner

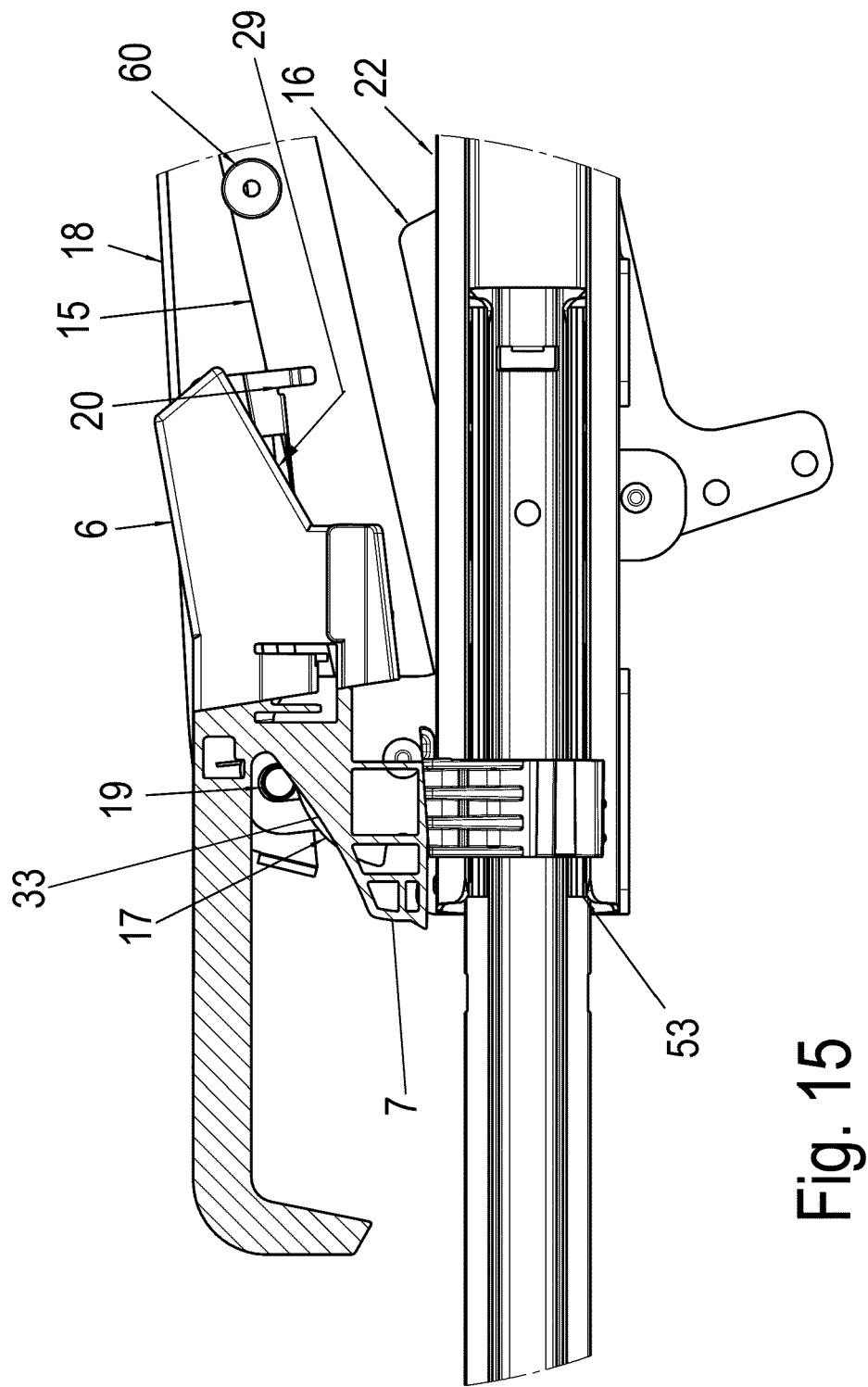

SLIDING-PIVOTING MECHANISM OF A SHELF OF A PIECE OF FURNITURE OR OF A DOMESTIC APPLIANCE, PIECE OF FURNITURE, AND DOMESTIC APPLIANCE

CROSS REFERENCE TO RELATED APPLICATIONS

This application is a U.S. nationalization under 35 U.S.C. §371 of International Application No. PCT/EP2015/062392, filed Jun. 3, 2015, which claims priority to German Application No. 102014107959.0 filed Jun. 5, 2014.

BACKGROUND AND SUMMARY OF THE DISCLOSURE

The disclosure relates to a sliding-pivoting mechanism of a shelf of a piece of furniture or a domestic appliance for pulling out or raising the shelf from a body of the furniture or from a useful space of a domestic appliance. The disclosure further relates to a piece of furniture as well as a domestic appliance with a sliding-pivoting mechanism.

Such sliding-pivoting mechanisms may be installed for facilitating the use of pieces of furniture or domestic appliances, especially dishwashers or cooking appliances. A shelf installed in such a piece of furniture or domestic appliance can be moved by means of a sliding-pivoting mechanism from a bottom position by pulling out and subsequent upward pivoting to an upward position in which a user can conveniently place items on the shelf or remove items placed on said shelf.

A generic sliding-pivoting mechanism is known for example from WO 2014/03 3092 A1.

The sliding-pivoting mechanism described there has proven its worth in practice.

It is problematic that when the shelf is subjected to heavy loads, the locking of the sliding-pivoting mechanism in the upper position in which the shelf is positioned in the lifted position for convenient loading and unloading does not always occur in a reliable manner.

The present disclosure is directed to a sliding-pivoting mechanism in which the locking of the sliding-pivoting mechanism is improved.

The sliding-pivoting mechanism in accordance with the disclosure comprises a rotatably fixed first and second pivot arm which is fastened to at least one of the side walls of the body of the piece of furniture or of the useful space of the domestic appliance by means of a first end parallel to the plane of the side walls. The pivot arms are arranged in parallel at a distance from each other. A guide rail is pivotably fastened to the respective second ends of the pivot arms parallel to the plane of the side walls in such a way that the guide rail can be pivoted from a bottom position within the body or the useful space to a lifted, upper position at least partly outside the body or the useful space. The shelf is fastened to a running rail which can be moved linearly on or in the guide rail. An activator is further fixed to said running rail. A locking mechanism of the sliding-pivoting mechanism arranged on the guide rail and on one of the pivot arms can be actuated with said activator, which locking mechanism is used for preventing a pivoting movement of the sliding-pivoting mechanism in a lifted and lowered end position. A support element is arranged in a stationary manner on the first pivot arm, which support element interacts with a guide bevel of the activator and with which the locking mechanism can be moved during lifting of the sliding-pivoting mechanism to a locking position which secures the lifted end position, wherein one end of the guide bevel of the activator which is disposed at the front in the pull-out direction is formed as a limit stop.

This support element allows the user in a simple way to push the shelf slightly against the pull-out direction during lifting of the shelf to the lifted end position shortly before reaching the lifted end position.

The thus associated movement of the activator along the support element produces reliable locking of the locking mechanism and supports secure reaching of the end position of the shelf that is necessary for the locking.

The front end of the guide bevel of the activator, which is formed in the pull-out direction as a limit stop, is used for limiting a displacement of the running rail against the pull-out direction up to the lifted end position of the sliding-pivoting mechanism, in which the locking mechanism has reached the locking position. This prevents excessive insertion of the shelf prior to reaching the lifted end position of the shelf.

According to one embodiment of the disclosure, the locking mechanism comprises a web with a pin protruding in the direction of the guide rail, which web is pivotably and resiliently mounted on one of the pivot arms and can be guided along a guide element to the guide rail from the locking position securing the lowered end position at least to the locking position securing the lifted end position.

According to an embodiment, these locking positions are defined in such a way that locking grooves are provided in the guide element in which the pin rests in the respective locking positions. During the lifting or lowering movement of the sliding-pivoting mechanism, the pin is guided along a guide track which is limited at its ends by locking grooves, which enables a precise coordination of the sequence of movement of the pivot arms.

According to an embodiment, the support element is formed as a pin protruding from the first pivot arm. The pin can be fastened to the support element as a separate component or can alternatively be integrally attached to the pivot arm as a part thereof.

According to an alternative embodiment, the support element is formed as a wheel which protrudes from the first pivot arm and can be rotated about a rotational axis oriented perpendicularly to a plane spanned by the pivoting movement of the pivot arms, so that during lifting of the shelf to its lifted end position may be only necessary to overcome rolling friction of the rotatable wheel, which further improves smooth running of the sliding-pivoting mechanism.

Furthermore, the activator comprises a first stop according to a preferred embodiment, with which the pin can be moved from a position blocking a pivoting movement of the pivot arms in the first locking groove when pulling the running rail in a pull-out direction A.

In order to move the pin from the second locking groove and from the position which produces locking in the lifted position, the activator may comprise a web which is inclined in the manner of a ramp in the pull-out direction, with which the pin can be moved out when pulling out the running rail in a pull-out direction.

This allows the user in a simple manner, by slightly pulling the shelf in the pull-out direction, to overcome the locking of the sliding-pivoting mechanism, so that the shelf can be pivoted from the lifted position to the lowered position or vice versa.

BRIEF DESCRIPTION OF THE DRAWINGS

FIGS. 5 and 6 show perspective views of the sliding-pivoting mechanism in a position in which the pivoting movement of the pivot arms is released, wherein FIG. 6 shows a detailed view of the section designated with VI in FIG. 5;

FIGS. 7 and 8 show perspective views, which correspond to FIGS. 5 and 6, of the sliding-pivoting mechanism during a pivoting movement, wherein FIG. 8 shows a detailed view of the section designated with VIII in FIG. 7;

FIGS. 9 and 10 show perspective views, which correspond to FIGS. 7 and 8, of the sliding-pivoting mechanism in a further progressed state of the pivoting shortly before reaching that the lifted end position, wherein FIG. 10 shows a detailed view of the section designated with X in FIG. 9;

FIGS. 11 and 12 show views corresponding to FIGS. 9 and 10 of the sliding-pivoting mechanism in the lifted end position, wherein FIG. 12 shows a detailed view of the section designated with XII in FIG. 11;

FIGS. 14 and 15 show views of the sliding-pivoting mechanism which correspond to FIGS. 11 and 12 during the release of the sliding-pivoting mechanism from the upper locking position, wherein FIG. 15 shows a detailed view of the section designated with XV in FIG. 14.

DETAILED DESCRIPTION OF THE DRAWINGS

In the following description of the drawings, terms such as top, bottom, left, right, front, rear, etc. exclusively relate to the respective illustration and position of the sliding-pivoting mechanism, pivot arms, guide rail, running rail, activator and the like, which illustration and position are selected as examples in the illustrations. These terms shall not be understood as restrictive, i.e., these references may change in different operating positions or due to mirror-symmetric design or the like.

FIGS. 1 to 15 show an embodiment of a sliding-pivoting mechanism in accordance with the disclosure, wherein exemplary positions of the sliding-pivoting mechanism are shown during a lifting process and a subsequent lowering process.

Figure 1:
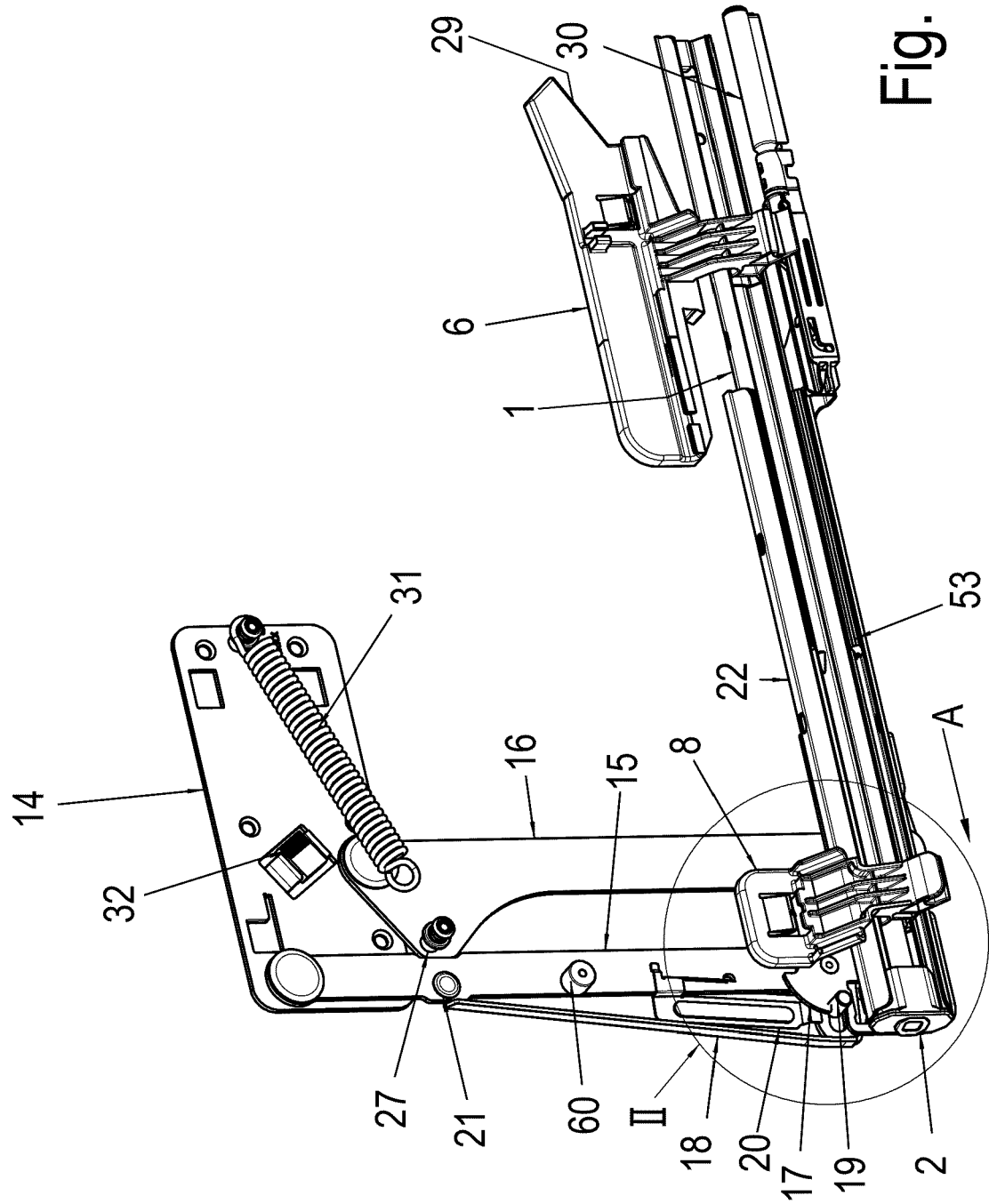
FIGS. 1 and 2 show a perspective view of an embodiment of a sliding-pivoting mechanism in accordance with the disclosure in the fully lowered position and a detailed view of the region designated with II in FIG. 1.

As is shown in FIG. 1, for example, the sliding-pivoting mechanism comprises two pivot arms 15, 16 which are arranged in parallel with respect to each other and spaced from each other. The pivot arms 15, 16 are fastened with a first end via a pivot joint to a side wall retainer 14. The side wall retainer 14 is preferably mounted on a side wall of a piece of furniture or a domestic appliance such as a dishwasher. Alternatively, the first ends of the pivot arms 15, 16 may be pivotally fastened directly to the side wall of the piece of furniture or the domestic appliance. The inner wall of domestic appliances is also understood as a side wall.

The second ends of the pivot arms 15, 16 which are spaced from the first ends are pivotably fastened on a guide rail 22 of a pull-out guide.

In addition to the guide rail 22, the pull-out guide comprises at least one running rail 1 which is linearly movable in the guide rail 22. The running rail 1 is preferably coupled via a ball bearing to the guide rail 22. An end stop 53 on the guide rail is used for limiting the path of the running rail 1 in the guide rail 22. The end stop 53 interacts with the ball bearing. It can also be considered to provide other forms of end stops on different fixed or movable parts. At least one further movable rail can be arranged between the guide rail 22 and the running rail 1 in order to extend the pull-out. A plug 2 may be arranged at the end of the running rail which is at the front in the pull-out direction A, which plug is used for limiting the path of the running rail 1 in the guide rail 22 against the pull-out direction.

An activator 6 and a fixing apparatus 8 are each fixed to the running rail 1 for fastening the shelf 34 (shown in FIG. 13) to the sliding-pivoting mechanism, on which the shelf can be fastened and especially latched.

Details on the fastening of the shell to the activator and the fixing apparatus 8 are described in closer detail in the aforementioned WO 2014/03 3092 A1, the disclosure of which is incorporated herein by reference for explaining numerous details of the sliding-pivoting mechanism.

As is further shown in FIG. 1, a damping unit 30 is arranged on the guide rail 22, which damping unit can be activated by means of the activator 6 when the shelf 34 travels to its end position in the body of the piece of furniture or the useful space of the domestic appliance.

It can also be considered to provide the arrangement of a self-retracting apparatus or a combined self-retracting and damping apparatus, with which the shelf 34 is preferably drawn to its end position in the furniture body or in the useful space of the domestic appliance.

The sliding-pivoting mechanism further comprises a locking mechanism which is arranged on the guide rail 22 and on one of the pivot arms 15, 16 and which can be activated by the activator 6 fixed to the running rail 1.

The locking mechanism prevents a pivoting movement of the sliding-pivoting mechanism in a lifted and a lowered end position of the sliding-pivoting mechanism.

The locking mechanism may consist of a web 18 which is retained in a pivotable and resilient manner on one of the pivot arms 15, 16 and on which a pin 19 is provided which protrudes in the direction of the guide rail 22.

The web 18 may be pivotably held via a rotating pin 21 on the pivot arm 15. A spring element 20 is used for resilient retaining, which spring element rests on the one hand on the web 18 and on the other hand on the pivot arm 15.

The pin 19 is in operative connection with a guide element 17. Said guide element 17, which is shown by way of example in FIG. 6, substantially consists of a plate-shaped element, having an edge formed as a guide track 28 which is limited by two locking grooves 23, 24.

The locking positions of the locking mechanism are the positions in which the pin 19, which is arranged on the resiliently retained web 18, rests in one of the two locking grooves 23, 24.

Figure 2:
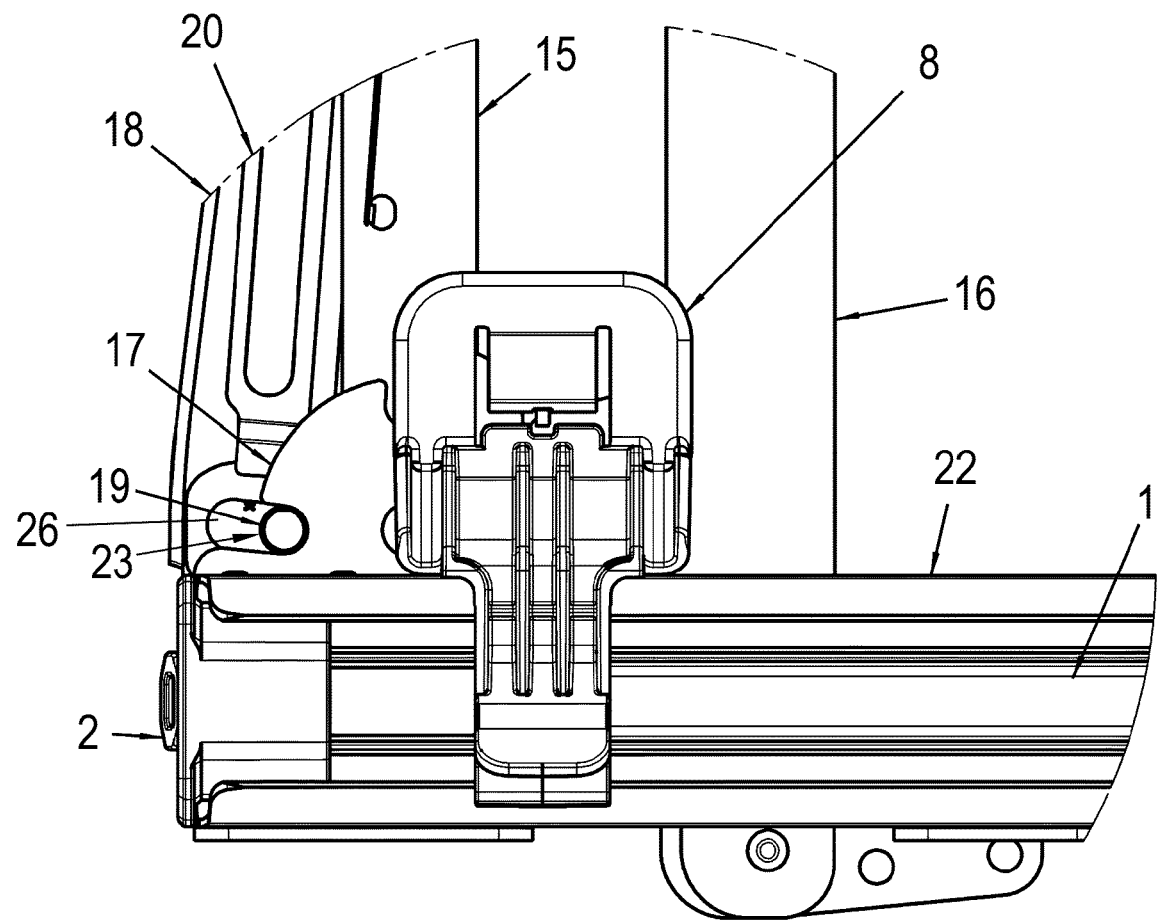

The bottom locking position is shown in FIGS. 1 and 2.

The first pivot arm 15 further comprises for the guidance of the pin 19 an end 25 extending perpendicularly to the longitudinal axis of the first pivot arm 15 and having a guide groove 26 through which the pin 19 extends.

Figure 3:
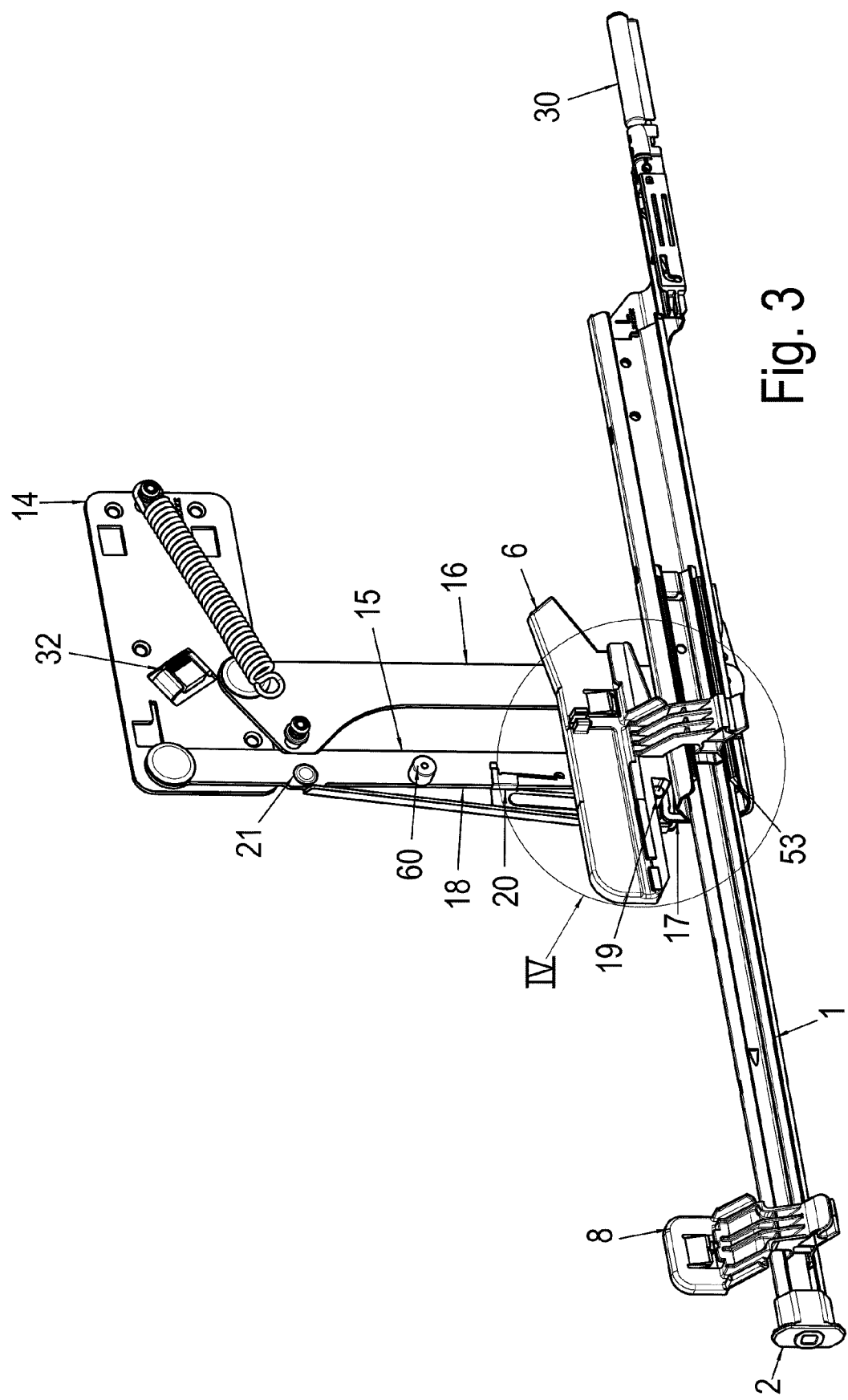
FIGS. 3 and 4 show perspective views of the sliding-pivoting mechanism of FIG. 1 after the completed displacement of the running rail from the guide rail prior to lifting the sliding-pivoting mechanism and a detailed view of the region designated with IV in FIG. 3.
Figure 4:
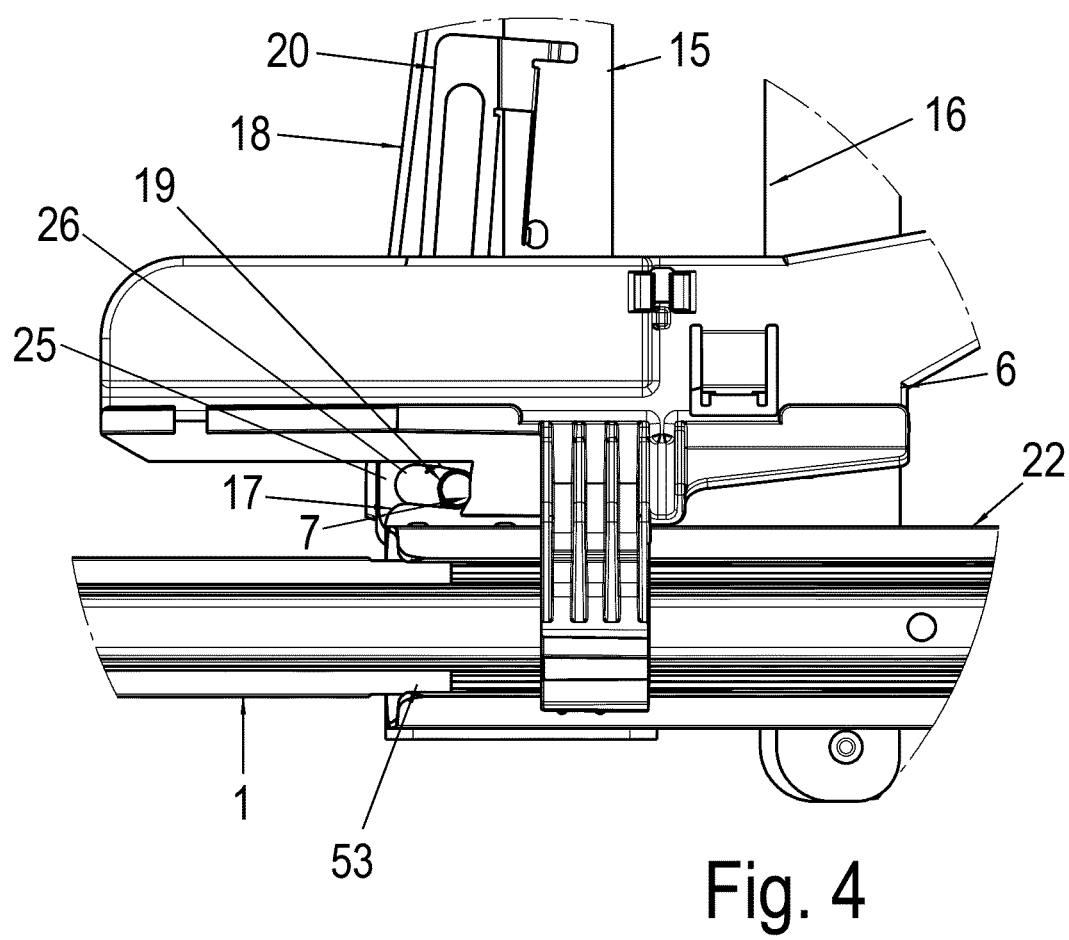

As is shown in FIGS. 3 and 4, the activator 6 comprises a first stop 7 with which the pin 19, during extension of the running rail 1 in a pull-out direction A, can be moved from a position in the first locking groove 23 which blocks a pivoting movement of the pivot arms 15, 16.

Figure 5:
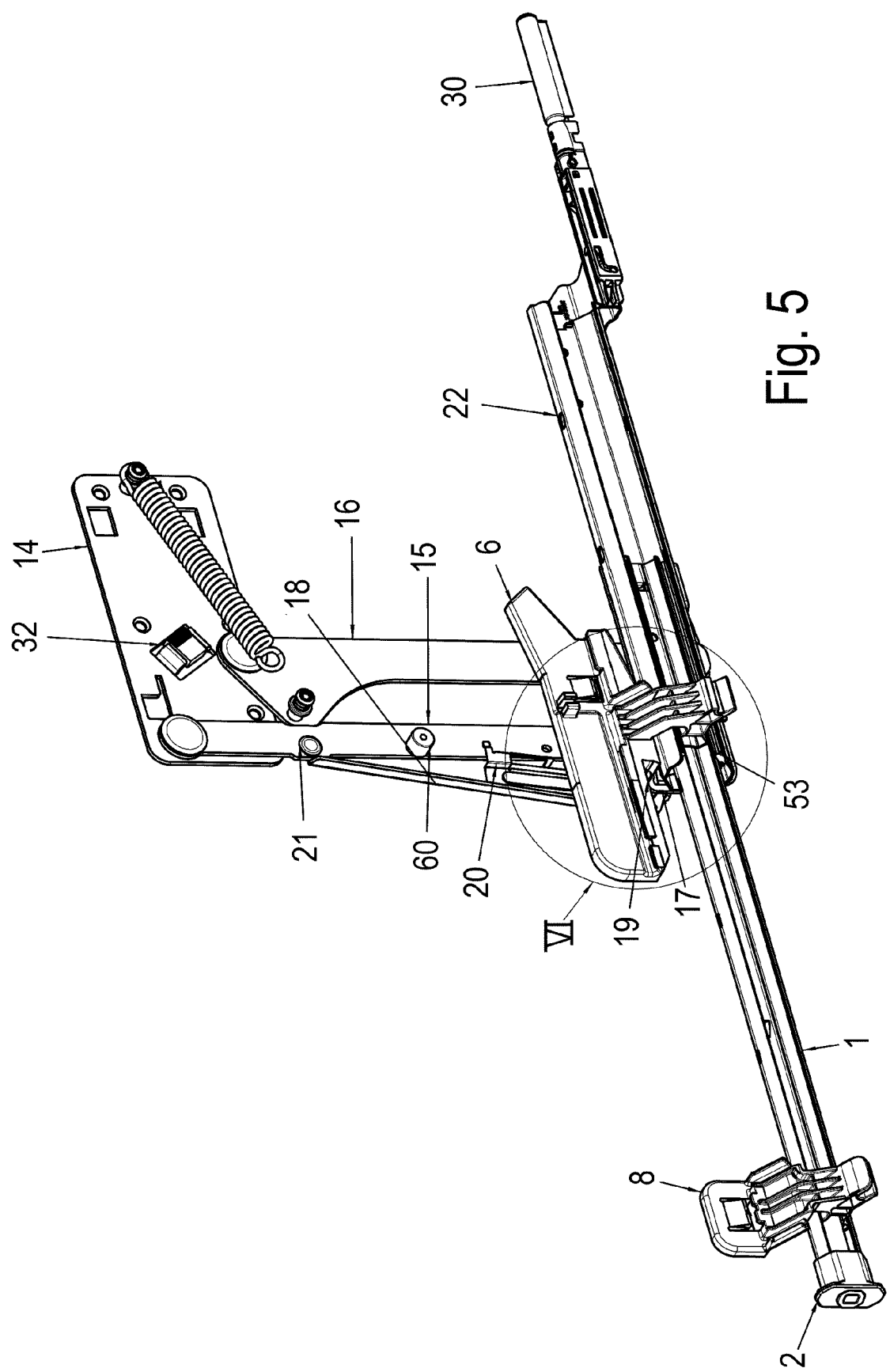
Figure 6:
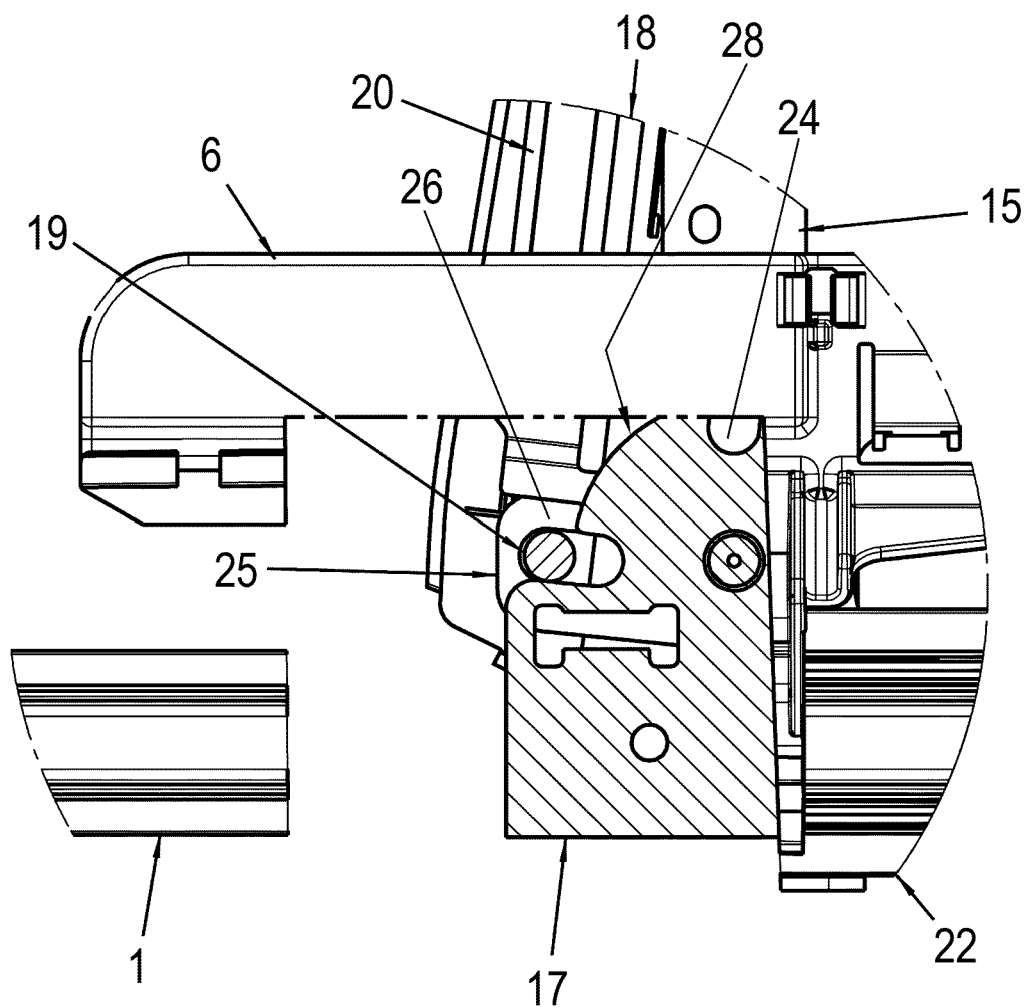

The position of the running rail 1 and the activator 6 as shown in FIGS. 5 and 6 and the position of the pin 19 shown in FIG. 6 show the release position of the locking mechanism, in which pivoting of the pivot arms 15, 16 is now possible.

Figure 7:
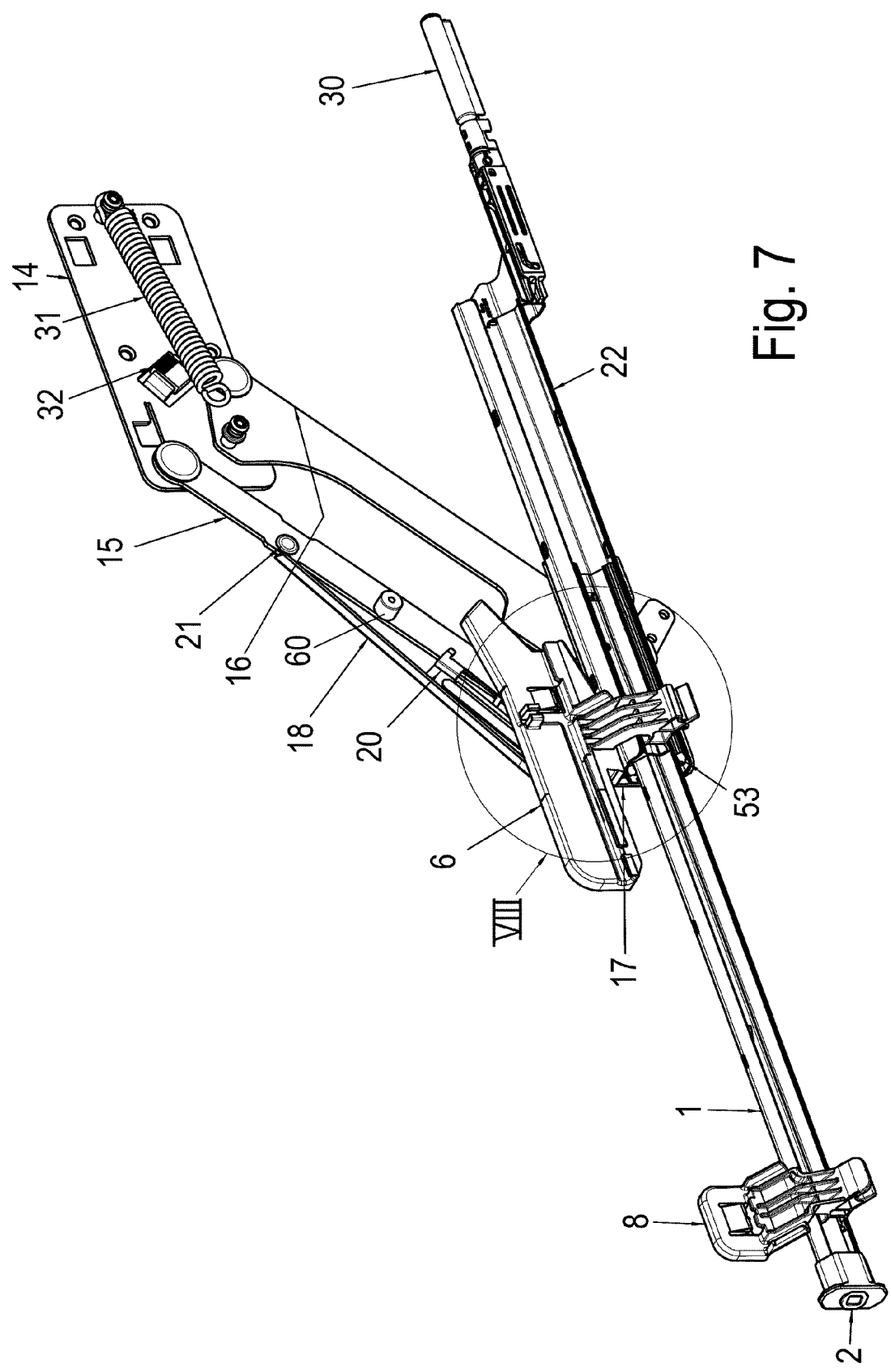
Figure 8:
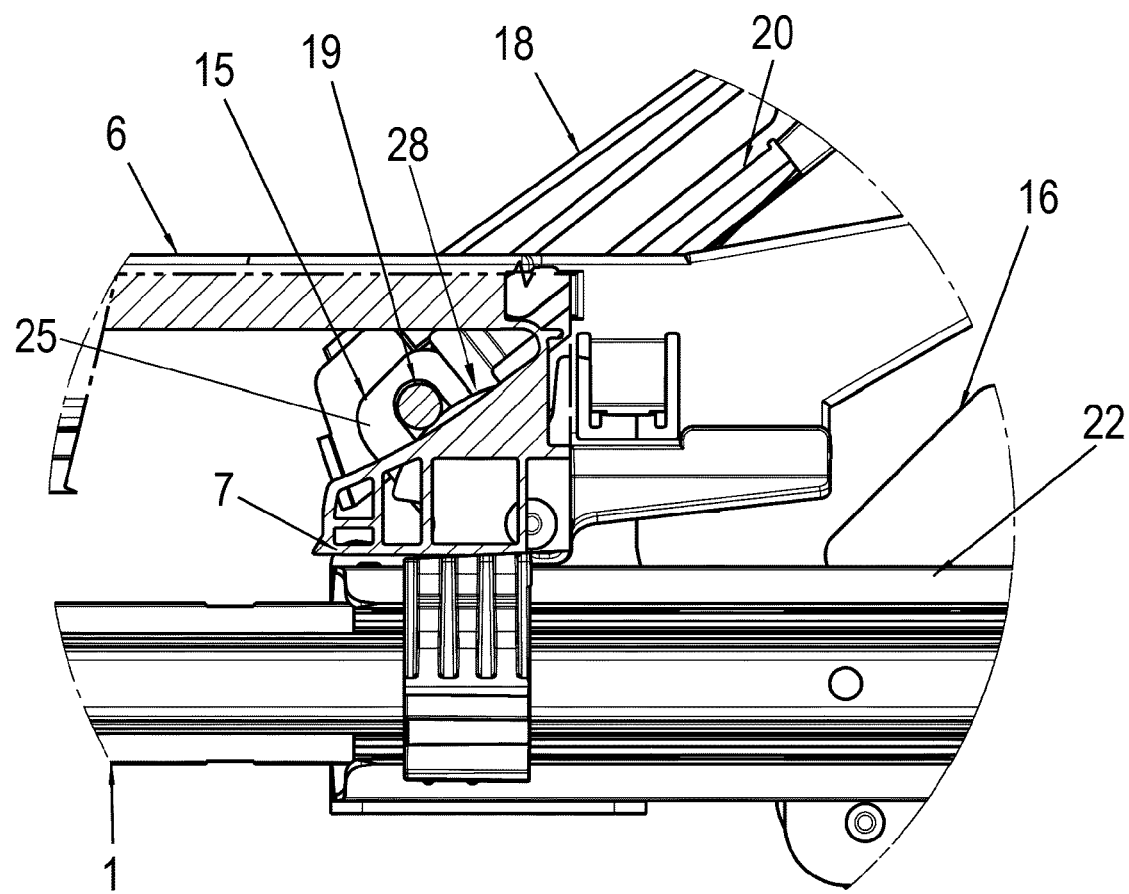

A partly lifted position of the sliding-pivoting mechanism is shown in FIGS. 7 and 8. In this position, the running rail 1 is completely pushed out of the guide rail 22 in the forward direction.

As is shown in FIG. 8, the pin 19 is moved along the guide track 28 along the guide element from the first locking groove 23 in the direction of the second locking groove 24 during the lifting process as a result of the pivoting of the pivot arms 15, 16.

As a result of the pin 19 resting on the guide curve 28, the resiliently held web 18 is deflected from its idle position in relation to the first pivot arm 15.

Figure 9:
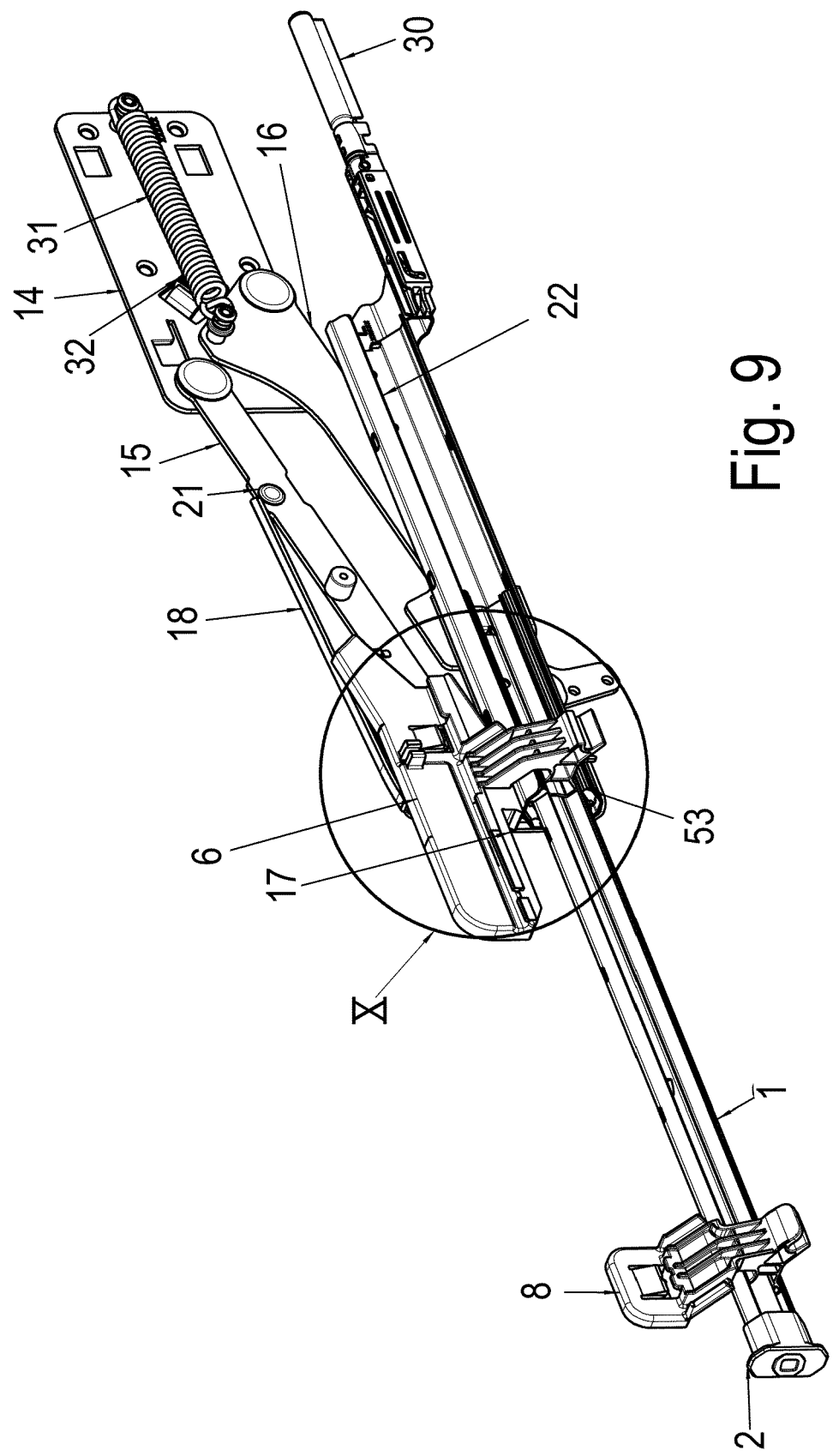
Figure 10:
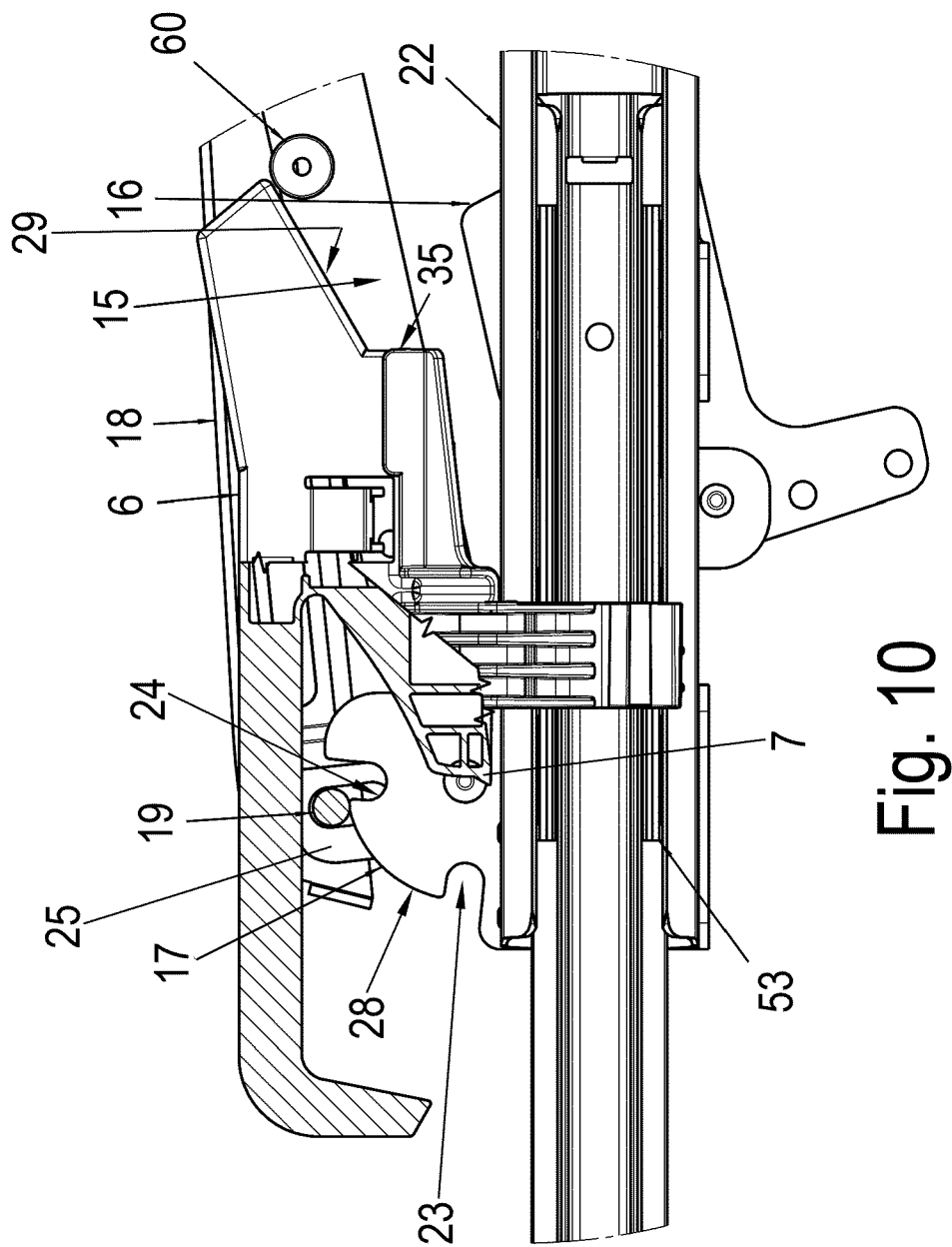
Figure 11:
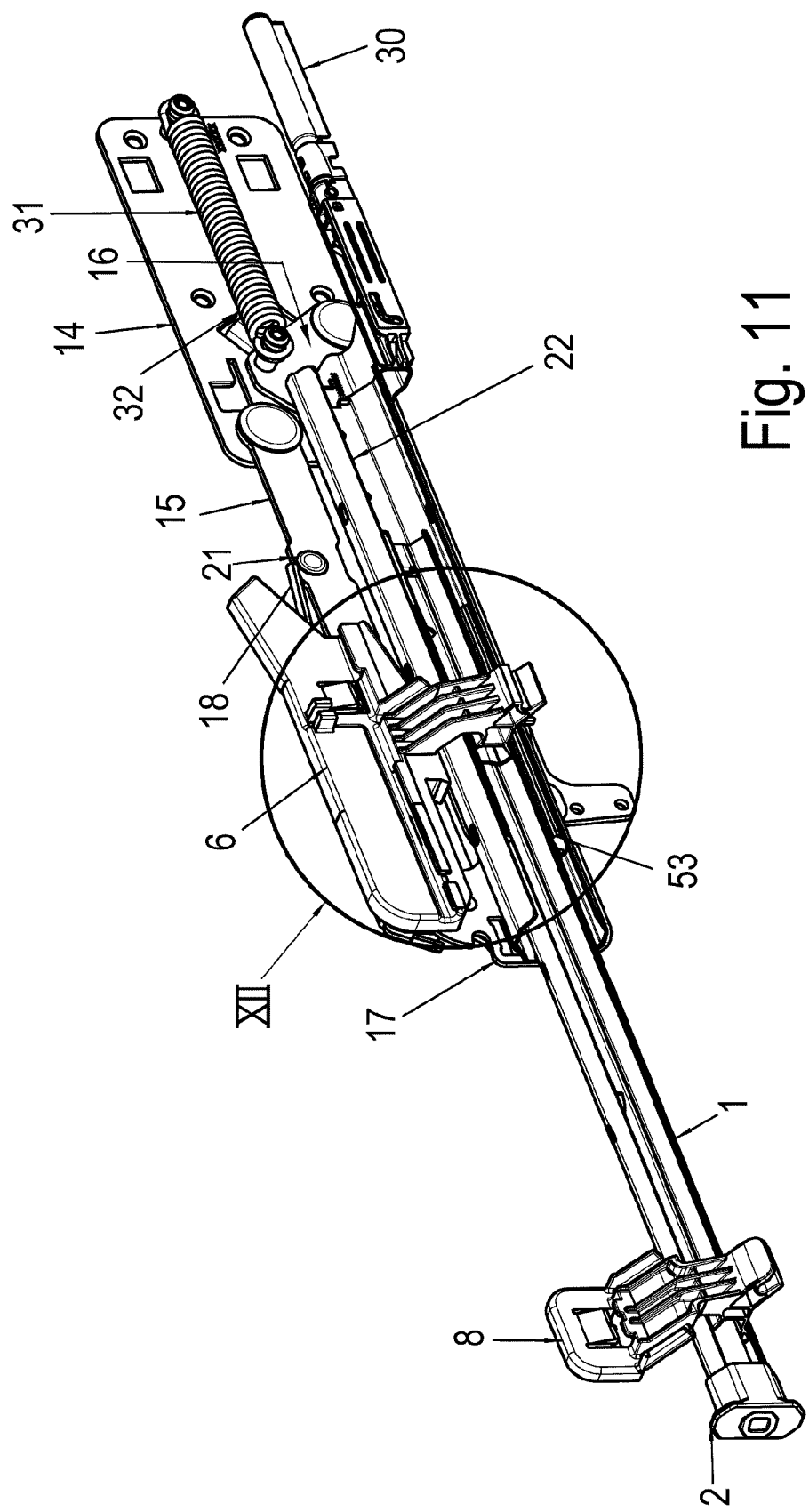

FIGS. 9 and 10 show a position of the sliding-pivoting mechanism shortly before reaching the upper end position, in which the pin 19 has nearly reached the second locking groove 24. In order to realise secure reaching of the end position of the shelf which is necessary for locking, the guide bevel 29 is formed in such a way that the user is caused to displace the shelf 34 and thus the running rail 1 and thus the activator 6 slightly against the pull-out direction A in the direction of the furniture body or in the direction of the useful space of the domestic appliance.

In this process, one end of the activator 6 which is at the rear in the pull-out direction A is pushed onto a support element 60 which is arranged in a stationary manner on the first pivot arm 15, with which the locking mechanism can be moved for lifting the sliding-pivoting mechanism to a locking position representative of the lifted end position 7.

Figure 12:
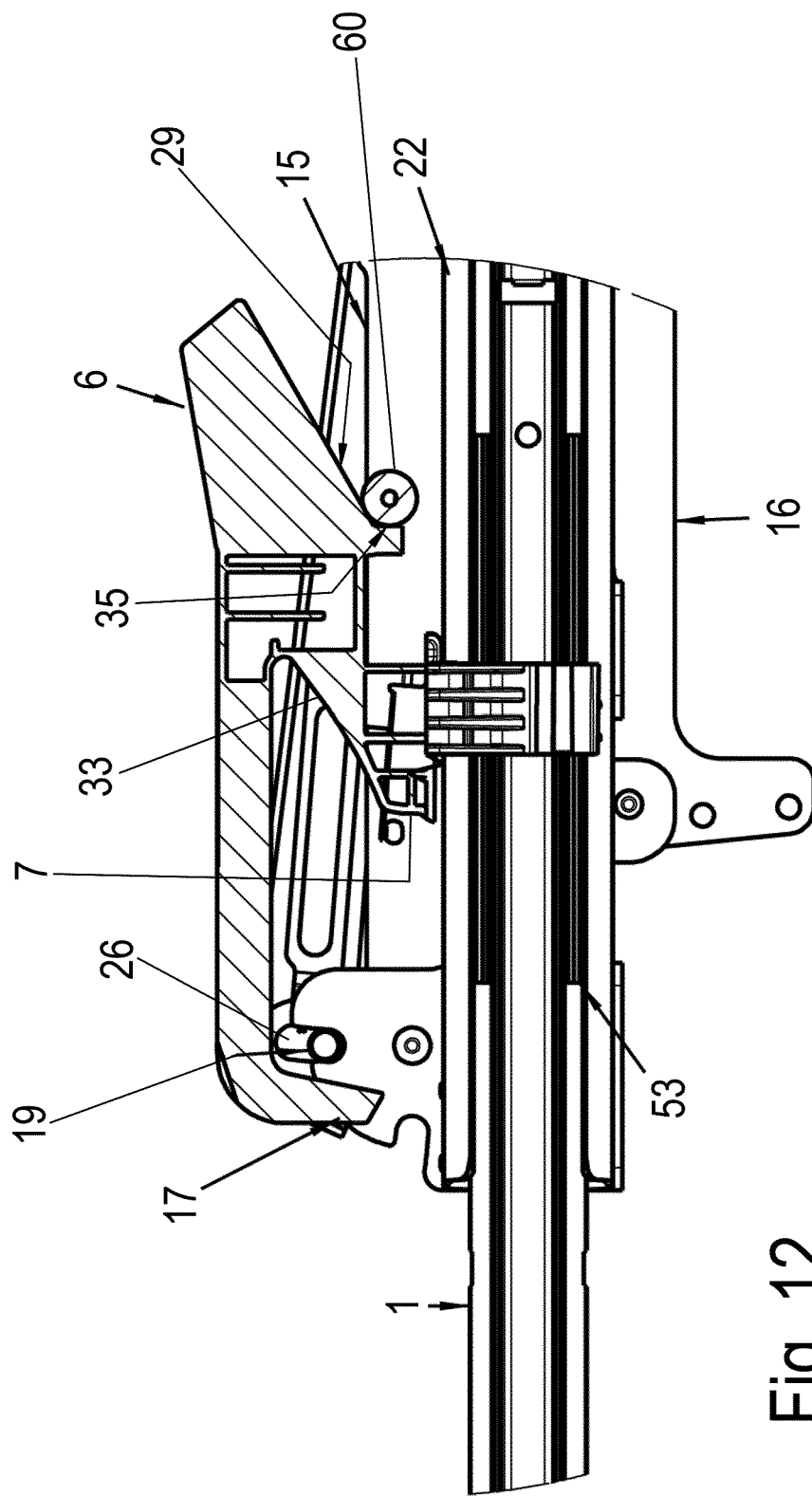

The support element 60, as shown by way of example in FIGS. 9, 10 and 12, is formed as a pin protruding from the first pivot arm 15.

Said pin can be fixed as a separate component to the first pivot arm 15 or can also be formed as a pin which is integrally attached to the first pivot arm 15.

It can also be considered to form the support element 60 as a wheel which protrudes from the first pivot arm 15 and can be rotated about a rotational axis oriented perpendicularly to a plane spanned by the pivoting movement of the pivot arms 15, 16.

During the further movement of the shelf in the direction of the furniture body or in the direction of the useful space of the domestic appliance, the rear end of the activator 6, which is formed as a guide bevel 29 and in which the bottom edge drops in the manner of a ramp in the pull-out direction A, rests on the support element 60.

This simultaneously leads to the horizontal or nearly entirely horizontal orientation of the two pivot arms 15, 16 and, as shown in FIG. 12, the engagement of the pin 19 into the second locking groove 24 of the guide element 17.

Further displacement of the shelf and thus the running rail 1 or the activator 6 in the direction of the furniture body or in the direction of the useful space of the domestic appliance is prevented by a limit stop 35 at the bottom end of the ramp-shaped guide bevel 29 of the rear part of the activator 6.

Figure 13:
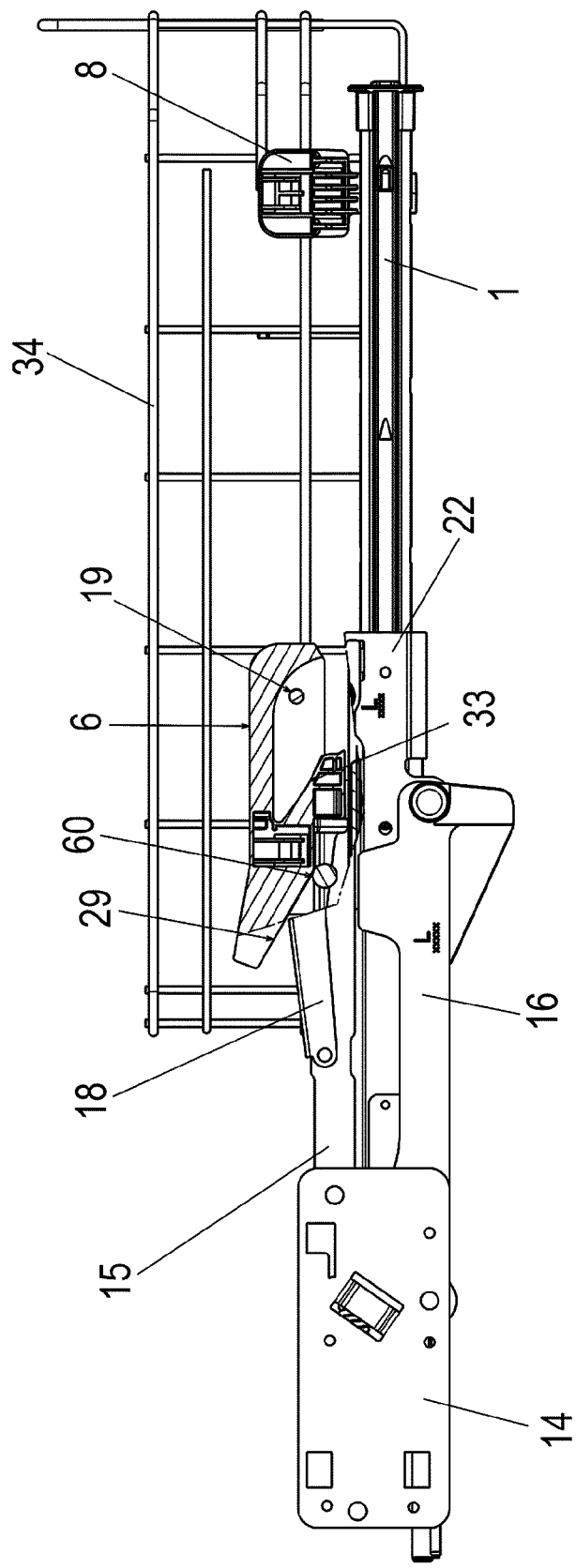
FIG. 13 shows a perspective view of the position of the sliding-pivoting mechanism shown in FIG. 11 from a different perspective.
Figure 14:
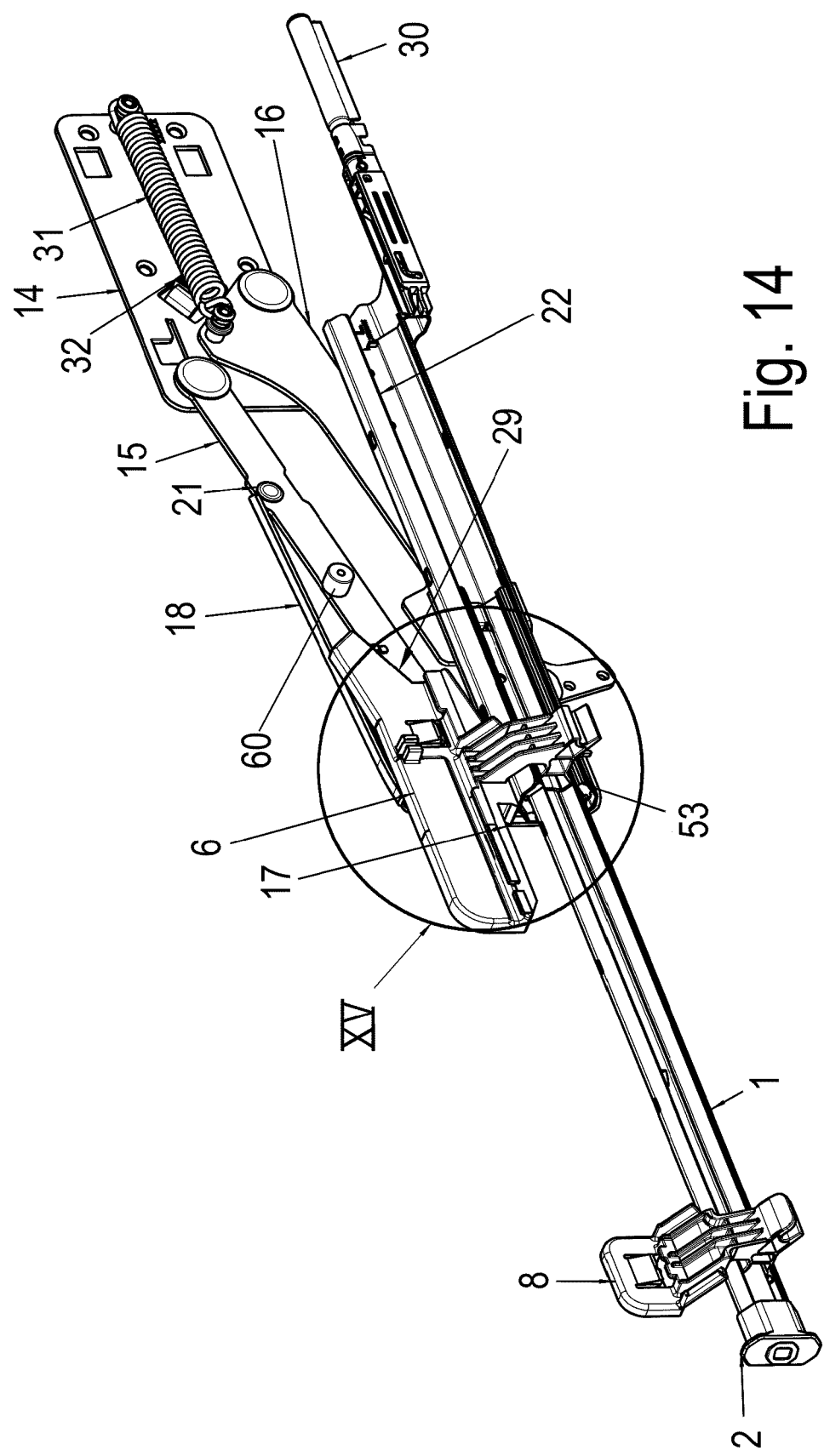

FIG. 13 shows the sliding-pivoting mechanism in this position from the opposite side. The illustration clearly shows that the support element 60 is at the bottom end of the guide bevel 29 of the activator 6.

In order to downwardly pivot the shelf back into the furniture body or the useful space of the domestic appliance after the completed loading or unloading of the shelf 34, the shelf and thus the running rail 1 and thus the activator 6 are moved at first over a short section in the pull-out direction A.

In this process, a web 33 of the activator 6, which is inclined in a ramp-like manner in the pull-out direction A, engages beneath the pin 19 and lifts it out of the locking groove 24 during the movement of the activator 6 and the pull-out direction and thus releases the pivoting movement of the sliding-pivoting mechanism, so that lowering of the shelf 34 can occur by pivoting the pivot arms 15, 16 to the bottom end position.

A lifting and/or lowering aid 31 is provided on at least one of the side walls or the side wall retainer 14 for supporting the lifting and lowering movement of the shelf 34, with which the pivoting movement of the pivot arms 15, 16 is supported.

The lifting or lowering aid 31 is preferably formed as a tension spring which is fastened to respective pins 27 on the side wall retainer or the side wall on the one hand and on the second pivot arm 16 on the other hand.

In order to prevent a pivoting movement of the pivot arms 15, 16 which goes beyond the upper end position of the pivot arms 15, 16, a limit stop 32 may be provided on the side wall retainer 14 which upon reaching the upper end position of the second pivot arm 16 strikes thereon.

The invention claimed is:

1. A sliding-pivoting mechanism of a shelf of a piece of furniture or domestic appliance for pulling out and lifting the shelf from a body of the piece of furniture or a useful space of the domestic appliance, comprising:
    a first pivot arm which is rotatably fixed to at least one of the side walls of the furniture body or the useful space with a first end parallel to the plane of the side walls,
    a second pivot arm which is rotatably fixed to at least one of the side walls of the furniture body or the useful space with a first end parallel to the plane of the side walls,
    wherein the pivot arms are arranged in parallel and at a distance from each other,
    wherein a guide rail is pivotably fastened to the respective second ends of the pivot arms parallel to the plane of the side walls in such a way that the guide rail can be pivoted from a bottom position within the furniture body or the useful space to a lifted, upper position at least partly outside the furniture body or the useful space,
    at least one running rail which is linearly displaceable in the guide rail and on which the shelf is fixed,
    wherein the sliding-pivoting mechanism comprises a locking mechanism, which is arranged on the guide rail and on one of the pivot arms and can be actuated by an activator fixed to the running rail, for preventing a pivoting movement of the sliding-pivoting mechanism in a lifted end position and a lowered end position,
    wherein
    a support element is arranged in a stationary manner on the first pivot arm, which support element interacts with a guide bevel of the activator and with which the locking mechanism can be moved during lifting of the sliding-pivoting mechanism to a locking position which secures the lifted end position, wherein one end of the guide bevel of the activator which is disposed at the front in the pull-out direction is formed as a limit stop.

2. A sliding-pivoting mechanism according to claim 1, wherein the locking mechanism comprises a web which is pivotably and resiliently mounted on one of the pivot arms and comprises a pin, which pin protrudes in the direction of the guide rail and can be guided along a guide element fixed on the guide rail from the locking position securing the lowered end position at least to the locking position securing the lifted end position.

3. A sliding-pivoting mechanism according to claim 2, wherein the guide element comprises respective locking grooves in which the pin rests in the respective locking positions, wherein the locking grooves delimit a guide track of the guide element, along which the pin can be guided from one of the locking positions to the second locking position.

4. A sliding-pivoting mechanism according to claim 1, wherein the support element is formed as a pin protruding from the first pivot arm.

5. A sliding-pivoting mechanism according to claim 4, wherein the support element is fixed to the first pivot arm or is integrally attached thereon.

6. A sliding-pivoting mechanism according to claim 1, wherein the support element is formed as a wheel which protrudes from the first pivot arm and can be rotated about a rotational axis oriented perpendicularly to a plane spanned by the pivoting movement of the pivot arms.

7. A sliding-pivoting mechanism according to claim 1, wherein the activator comprises a first limit stop with which the pin can be moved out from a position blocking a pivoting movement of the pivoting arms in the first locking groove when pulling the running rail in a pull-out direction.

8. A sliding-pivoting mechanism according to claim 1, wherein the activator comprises a web which is inclined in the manner of a ramp in the pull-out direction, with which the pin can be moved out from a position blocking a pivoting movement of the pivoting arms in the second locking groove when pulling the running rail in a pull-out direction.

9. A piece of furniture with a furniture body and at least one shelf fixed in the furniture body with a sliding-pivoting mechanism, with which the shelf can be pulled out of and lifted from the furniture body, wherein the sliding-pivoting mechanism is formed according to claim 1.

10. A domestic appliance, especially a dishwasher or a cooking appliance, having at least one shelf fixed to the inner sides of a useful space by a sliding-pivoting mechanism, with which the shelf can be pulled out of and lifted from the useful space, wherein the sliding-pivoting mechanism is formed according to claim 1.

* * * * *